Jan. 28, 1936.  W. RAISCH ET AL  2,028,949
FILTER
Filed March 28, 1935
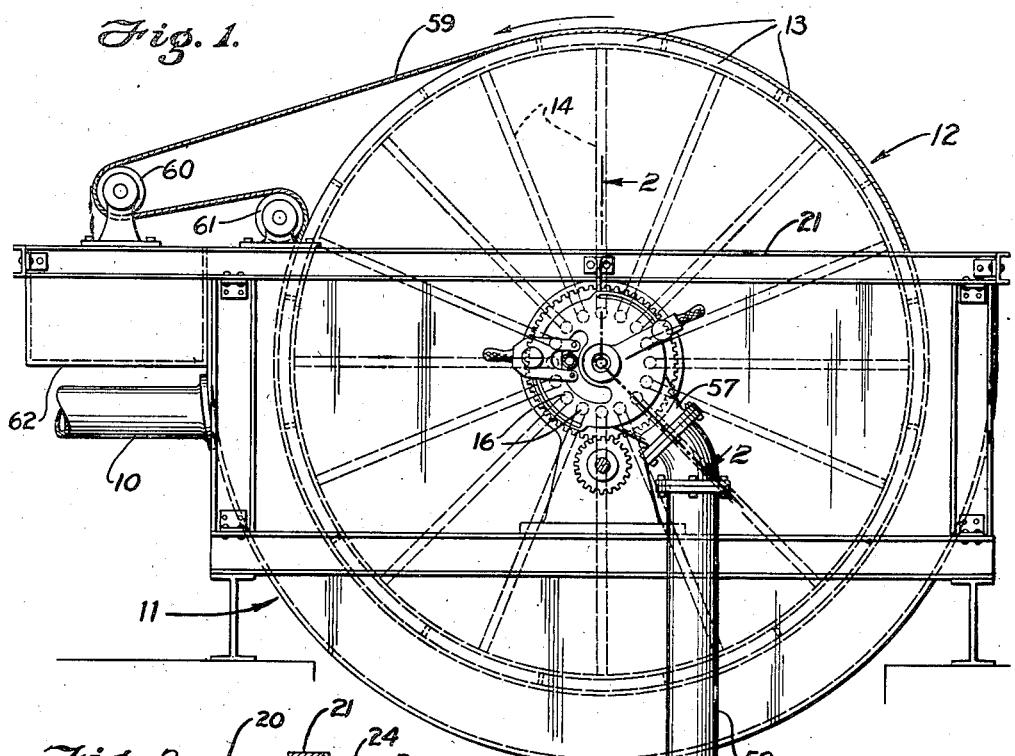
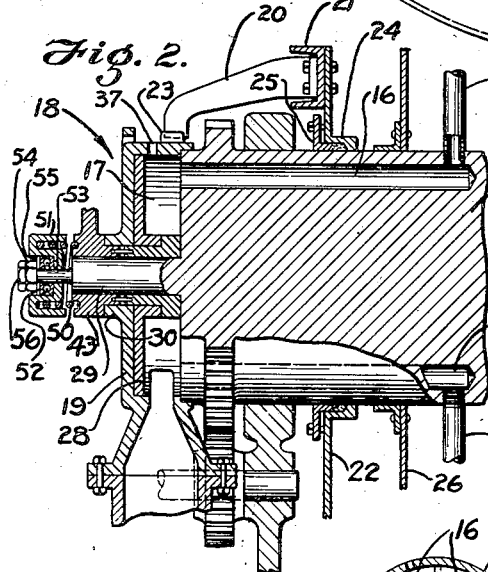
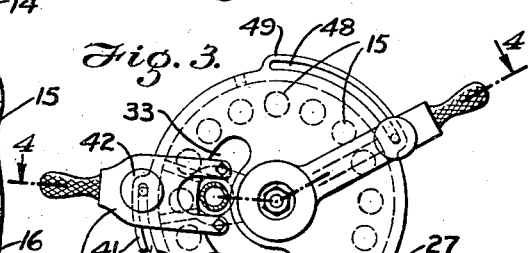
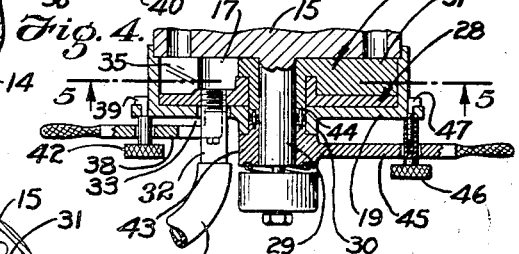
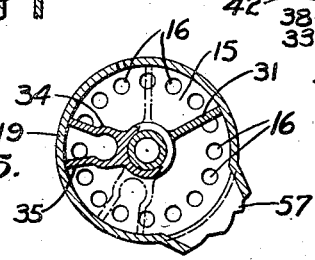
INVENTORS
*William Raisch*
*John H. Fedeler, Jr.*
BY *Louis L. Ansart*
*their* ATTORNEY Patented Jan. 28, 1936

2,028,949

UNITED STATES PATENT OFFICE 2,028,949

FILTER

William Raisch, Forest Hills, N. Y., and John H. Fedeler, Jr., Glen Rock, N. J., assignors to Underpinning & Foundation Company, Inc., a corporation of New York Application March 28, 1935, Serial No. 13,450

4 Claims. (Cl. 210—197)

This invention relates to pressure filters and more particularly to valve structures to be used at one or both ends of a rotary suction or vacuum filter.

In a filter of this general type the liquid to be filtered is fed to a filter pan or tank in which a filter drum rotates about a horizontal axis, the drum being partially submerged in the liquid in the tank. At its periphery the drum is divided into a plurality of sections extending from one end to the other of the drum and provided at the surface of the drum with a filter medium which may comprise a filter cloth.

During the rotation of the drum, each section or compartment, as it reaches a predetermined position during its downward movement into the liquid, is subjected to a vacuum whereby filtered liquid is drawn into the section and a filter cake is formed on the surface of the filter medium. The vacuum on the compartment may be maintained until the section rises out of the liquid, and in many cases even further to enable the cake to be dried if desired. The filtrate first drawn into each compartment is cloudy and then as the cake is built up the filtrate becomes clear. The cloudy filtrate is drawn off separately and is customarily returned to the filter for further treatment.

To assure the formation of an effective filter cake suitable material, such as paper pulp may be introduced into the liquid on its way to the filter. The filter cake raised from the liquid by rotation of the drum is removed therefrom before the corresponding part of the drum surface again enters the liquid in the tank.

Each section of the filter is therefore moved through a plurality of zones of action comprising a cloudy-filtrate-removal zone, a clear-filtrate-removal zone, a drying zone, a stripping zone, and other zones if desired.

When the rate of supply of the liquid to be filtered varies considerably from time to time, as in the case of sewage, the effective filter area need not be so large for small flows as for large flows and to maintain a uniform condition of the clear filtrate the area of the clear filtrate zone may be varied by forward and rearward shifting of the cloudy filtrate zone and by varying the position of the other end of the clear filtrate zone.

An important object of the present invention is to provide novel and advantageous means whereby the zones of action of the filter may be varied during the operation of the filter, to positions where they will produce the desired results.

Other objects, features and advantages will appear upon consideration of the following description and of the drawing, in which:—

Fig. 1 is a view in elevation of a filter embodying a preferred form of the invention;

Fig. 2 is a section on the line 2—2 of Fig. 1;

Fig. 3 is a fragmentary view on a larger scale of part of the structure shown in Fig. 1;

Fig. 4 is a section taken on the line 4—4 of Fig. 3; and

Fig. 5 is a section taken on the line 5—5 of Fig. 4.

Referring to the drawing, sewage or other liquid to be filtered is supplied through a pipe 10 to a filter pan 11 containing a partially submerged filter drum 12 mounted to rotate about a horizontal axis. The filter drum 12 may be divided at its periphery into a plurality of sections or compartments 13 covered with a filter medium, such as cloth, at their outer sides, said sections being connected by pipes 14 with a hub 15 at one end of the drum or hubs 15 at both ends of the drum.

As illustrated the pipes 14 are connected with ducts 16 extending to the outer end surface or face 17 of the hub 15, such outer end being adapted for use as the rotary part of a valve 18. Such rotary part cooperates with a stationary valve member 19 held against rotation by suitable means that may include a bracket 20, secured to a channel 21, serving as a support for the end wall 22 of the filter pan 11, and one or more lugs 23 on the member 19. Escape of the liquid in the filter pan through the opening in the end wall 22 may be prevented by suitable means which may include packing 24 and a packing gland 25 (Fig. 2). The filter drum 12 may be formed with an end wall 26 (Fig. 2) suitably secured on the hub 15.

The stationary valve member 19 and other valve parts 27 and 28, which are normally stationary but may be shifted to vary the limits of the zones of operation, may be supported by means comprising a spindle 29 coaxial with the hub 15 and preferably integral therewith. The stationary member 19 may be in the general form of a cap including a disk portion with a hub 30 and a rim with its edge engaging the end of the hub 15, thereby providing a chamber between the disk portion of the cap and the end of the hub. To guard against leakage of air between said rim and the end of the hub, the engaging surfaces are very carefully fitted and so shaped that the air can not have a straight passage therebetween. Preferably the rim of the cap 19 is slightly larger in diameter than the hub 15 and is provided at its end with an annular recess of such a size that the end of the hub fits closely therein.

The valve part 27 may be formed with a blade 31, serving as a partition at the end of the clear-filtrate-removal zone, and a hub fitting on the spindle 29 and including a part engaging the hub 15 and a reduced portion extending outwardly. The member 28 comprises a disk portion fitting in the rim of the member 19 and having an inwardly extending hub fitting on the reduced portion of the hub of the member 27 and engaging the shoulder provided by the larger portion of such hub, the blade or partition 31 being suitably recessed to permit this arrangement. The disk of the member 28 is provided with a suitable bore into which is threaded a nipple 32 extending through an opening 33 in the stationary valve member 19, said opening 33 being preferably in the form of an arcuate slot. At the inner side of its disk portion, the member 28 is provided with two partitions 34 and 35 extending from the hub of member 28 to the inner surface of the rim of member 19 and fitting closely against the face of the hub 15.

The partitions 34 and 35 enclose the cloudy-filtrate-removal zone from which the cloudy filtrate may be drawn through the nipple 32 and a tube 36 which may be flexible to facilitate adjustment of the partitions 34 and 35 to vary the position of the cloudy-filtrate-removal zone and also the beginning of the clear-filtrate-removal zone, the end of the last mentioned zone being determined by the position of the partition 31. Between the partitions 31 and 34 is a zone which might be divided up and/or used for different purposes but which, as illustrated, is maintained at atmospheric pressure by means comprising a passage 37.

Adjustment of the member 28 carrying the partitions 34 and 35 may be effected by suitable means, which may include an arm 38 having a handle at its outer end and at its inner end a fork attached to the adjustable member 28 at opposite sides of the nipple 32. To hold the arm 38 in any position to which it may be adjusted, use may be made of any suitable means such as a bolt 39 shiftable around the axis of the valve member 19 in a slot 40 in an arcuate flange 41 fixed on the valve member 19, and a finger piece 42 extending through an opening in the arm 38 and screwed on the bolt 39, which bolt may be held against independent rotation about its own axis by providing it with a head suitably shaped to cooperate with the peripheral surface of member 19 so as to produce the desired result.

Adjustment of the partition 31 may be effected through the hub of the valve member 27 and a sleeve or hub 43 on the spindle 29 at the outer side of the valve member 19. In order that pressure exerted on the hub 43 may act to press the member 19 against the member 28, the member 28 against the member 27, the member 27 against the face of the hub 15, and the rim of the member 19 against the hub 15, the connection between the hub 43 and the hub of the valve member 27 must be such that, while these hubs are held against rotation with respect to each other, provision must be made for relative movement in an axial direction.

This result may be attained by making the hub of the member 27 of such length that it will extend only part of the way through the hub of the member 19 and by providing the hub 43 with a reduced portion extending into the hub of the member 19 but terminating short of the hub of the member 27, the rotation-effecting connection between the hub 43 and that of the member 27 being effected by suitable means such as pins 44 fixed in the hub of the member 27 and extending part of the way into openings in the hub 43. The hub 43 may be turned by suitable means such as an arm 45 fixed on the hub and having a handle at its outer end. The handle 45 may be secured in adjusted position in a suitable manner, as by means of a finger piece 46 extending loosely through an opening in said arm 45 and screwed on the end of a bolt 47 projecting through a slot 48 in an arcuate flange 49 at the periphery of stationary valve member 19. The bolt may be held, as to rotational movement, by suitable means such as a suitably shaped bolt head engaging the peripheral surface of the member 19.

The pressure on the hub to hold the contacting surfaces of the valve parts in effective sealing relation may be produced by suitable means which may include a helical compression spring 50, one end of which engages the hub 43 in a suitable groove at the outer face thereof. A substantial portion of the spring is held in a rather deep annular groove or recess in a spring-holder 51 having an outwardly facing cup-shaped central portion adapted to receive ball bearings 52 mounted on a spindle or bolt 53 constituting a reduced extension of the spindle 29. The compression of the spring 50 may be controlled by means of a nut 54 threaded on the bolt 53 and acting through a washer 55 interposed between the ball bearings 52 and the nut 54, this nut being held in adjusted position by suitable means such as a lock nut 56. It will be evident that the ball bearings 53 serve to avoid any substantial twisting action on the spring 50, which might otherwise result from the rotation of the hub 15 of the filter drum 12.

The clear filtrate is of course of much greater volume than the cloudy filtrate and to take care of it the stationary valve member 19 may be provided at its periphery and adjacent to the clear-filtrate-removal zone with an outlet 57 of relatively large cross section. From this outlet the clear filtrate is drawn off through a pipe 58 under a suitable vacuum.

The cake may be stripped from the filter drum 12 in any suitable manner. As illustrated in Fig. 1 the stripping may be effected by means of endless flexible members or cords 59 passing from the top of drum 12 to the upper parts of one or more rotatable members or pulleys 60, around to the lower sides of members 60 and back toward the drum, and over one or more rotatable members or pulley 61 adjacent to the drum and from which the cords are returned to the drum 12. As the cords 59 pass around the pulleys 60 the cake will be discharged into a container 62 to be disposed of in any suitable way. Under some conditions the cake may be mixed with fresh sewage and returned to the filter pan 11.

The operation of the device may be substantially as follows: Sewage passes through the pipe 10 into the filter pan 11 and the drum 12, which is partially submerged in the sewage in the pan 11, is rotated in the counter-clockwise direction (Fig. 1). As sections 13 pass down into the sewage, the ports formed by the ends of corresponding ducts 16 in the rotary part of the valve are brought into communication with the suction or vacuum chamber between the partitions 34 and 35 so that cloudy filtrate is withdrawn through the tube 36 and a cake built up on the surface of the drum. Upon passing the partition 35, the ducts 16 are subjected to the vacuum action of the pipe 58 and the resulting filtrate, which is now clear due to the cake on the corresponding part of the filter drum 12, is drawn off through said pipe 58. As soon as the ducts 16 pass the partition 31 they are relieved from the vacuum action of the pipe 58, the pressure in the chamber between the partitions 31 and 34 being atmospheric due to the passage or opening 37 connecting the chamber with the outer air. It will be evident that, if the partition 31 be turned up far enough, the sections 13 will be subjected to vacuum action after they pass above the surface of the liquid in the filter pan and the cake will be dried accordingly. Thus by swinging the partition 31 up to its dot-and-dash-line position (Fig. 5), the cake-drying effect will be increased and by swinging the partitions 34 and 35 down to their dot-and-dash line position the effective filter area will be decreased.

Thus when the sewage flow is at a maximum the partitions 34 and 35 may be positioned so that each peripheral section 13 of the filter drum will be subjected to a vacuum as soon as it enters the sewage and the partition 31 will be so placed that not only will each section be subjected to a vacuum until it passes out of the sewage but beyond that position if drying of the cake is to be effected. It will also be evident that the positioning of the various partitions may be influenced by the height of the sewage in the filter pan 11.

It will be evident that the valve of the present invention enables ready adjustment of the apparatus to meet the requirements under varying loads and conditions.

It should be understood that various changes may be made and that certain features may be used without others without departing from the true scope and spirit of the invention.

Having thus described our invention, we claim

1. In a rotary filter, a revolving valve member having in the face of one of its ends a plurality of ports arranged at intervals around the center of said face, a stationary valve member cooperating with the face of the revolving member to provide a main chamber therebetween, means including three radial partitions to set off in said main chamber a cloudy filtrate chamber and a clear filtrate and drying chamber, and means connected with said partitions at their inner ends for varying the positions of said partitions from the exterior of the valve without interrupting the action of the filter, such varying means including means for varying the position of one of said partitions and means for simultaneously varying the positions of the other two of said partitions.

2. In a rotary filter valve, a revolving valve member having at its face a plurality of ports arranged at intervals around the same, a spindle coaxial with said revolving valve member and projecting from the face thereof, a cup-shaped stationary valve member having an annular flange engaging said revolving valve member outside of said ports and also a central hub with an opening through which the spindle passes, a hub rotatable on said spindle and having a portion with an annular flange engaging the face of the revolving valve member and a sleeve portion extending part way through the hub of the cup-shaped valve member, an operating handle mounted on said spindle outside of the cup-shaped member and comprising a hub with a sleeve portion projecting into the hub of said cup-shaped member, means effecting a rotational connection between said sleeve portions while permitting relative movement in an axial direction, a disk inside said cup-shaped member and fitting closely in the annular flange thereof, said disk having a hub with an inwardly projecting sleeve portion mounted on the sleeve portion of the hub which is mounted on the spindle and engaging the annular flange of such hub, a blade on said annular flange extending radially to the inner surface of the annular flange of the stationary valve member and from the face of the revolving valve member to the inner face of said disk, a passage through said disk, two substantially radial partitions projecting inwardly from said disk to the face of said revolving valve member at opposite sides of said passage and outwardly to the inner surface of said annular flange of the cup-shaped member, a tube connected with said passage through an opening in the end of said cup-like member, and means operable from the exterior of said valve for rotatably shifting said disk.

3. In a rotary filter valve, a revolving valve member having a plurality of ports in its face, a cap-like stationary valve member engaging said revolving valve member, said cap-like valve member having a circular central opening in its end, a round spindle of less diameter than said opening projecting from said revolving member through said opening, two shiftable valve members mounted on said spindle between the revolving member and the stationary member and provided with partitions to set off cloudy and clear filtrate vacuum chambers, a handle with a hub on said spindle, means extending through said opening in the stationary valve member and along said spindle to connect said hub with one of said shiftable members, such connecting means enabling such shiftable member to be rotated by said handle while permitting relative movement thereof along said spindle, and means acting on said hub at the outer side thereof to press it against said stationary member thereby pressing the same against said revolving member and the shiftable members together and against said revolving valve member.

4. In a rotary filter valve, a revolving ported member, a stationary valve member cooperating therewith, two controlling members rotatably supported between said revolving member and said stationary member, one of said controlling members having two partitions to provide a vacuum chamber and the other having one partition to cooperate with one of said two partitions to provide another vacuum chamber, two handles at the exterior of said valve mounted to swing about the axis of said ported member, each of said handles being connected with one of said controlling members, means for securing each of said handles in its angular position as adjusted while permitting movement along said axis relative to said stationary member, and means for yieldably pressing said stationary member against said revolving member and against said controlling members to press them together and against said revolving member.

WILLIAM RAISCH.
JOHN H. FEDELER, Jr.